(12) United States Patent
Sekine et al.

(10) Patent No.: US 10,384,355 B2
(45) Date of Patent: Aug. 20, 2019

(54) ROBOT

(71) Applicant: Seiko Epson Corporation, Tokyo (JP)

(72) Inventors: Kotaro Sekine, Matsumoto (JP); Tetsuya Kawase, Azumino (JP)

(73) Assignee: Seiko Epson Corporation (JP)

( * ) Notice: Subject to any disclaimer, the term of this patent is extended or adjusted under 35 U.S.C. 154(b) by 406 days.

(21) Appl. No.: 15/206,534

(22) Filed: Jul. 11, 2016

(65) Prior Publication Data

US 2017/0028568 A1  Feb. 2, 2017

(30) Foreign Application Priority Data

Jul. 27, 2015 (JP) .................................. 2015-148045

(51) Int. Cl.
*B25J 19/00* (2006.01)
*B25J 9/00* (2006.01)

(52) U.S. Cl.
CPC ......... *B25J 19/0062* (2013.01); *B25J 9/0018* (2013.01)

(58) Field of Classification Search
CPC ....... B25J 19/0062; B25J 9/0018; B25J 18/04
USPC ......................................... 74/490.01–490.06
See application file for complete search history.

(56) References Cited

U.S. PATENT DOCUMENTS

| | | | | |
|---|---|---|---|---|
| 4,781,103 A * | 11/1988 | Maruyama | ............... | B25J 9/148 414/730 |
| 5,107,754 A * | 4/1992 | Nishikawa | ................. | B25J 9/06 60/484 |
| 5,138,904 A * | 8/1992 | Lande | ................. | B05B 13/0431 74/661 |
| 5,220,849 A * | 6/1993 | Lande | ................... | B05B 13/005 74/479.01 |
| 5,261,316 A * | 11/1993 | Nishikawa | ................. | B25J 9/06 91/422 |
| 5,293,107 A * | 3/1994 | Akeel | ......................... | B25J 9/08 310/83 |
| 8,156,840 B2 * | 4/2012 | Tange | ....................... | B25J 9/102 74/490.01 |
| 8,171,822 B2 * | 5/2012 | Yamamoto | .............. | F16H 57/04 184/109 |
| 8,783,848 B2 * | 7/2014 | Yokozawa | ................. | B41J 3/28 347/102 |
| 8,801,125 B2 * | 8/2014 | Akiyama | ............... | B41J 2/2114 347/101 |
| 2005/0133305 A1 * | 6/2005 | Okada | .................. | B25J 19/0062 184/65 |
| 2008/0287243 A1 * | 11/2008 | Yamamoto | .............. | F16H 57/04 475/159 |
| 2009/0169343 A1 * | 7/2009 | Tange | ....................... | B25J 9/102 414/217 |
| 2012/0229535 A1 * | 9/2012 | Akiyama | ............... | B41J 2/2114 347/5 |

(Continued)

FOREIGN PATENT DOCUMENTS

JP  11-254377 A  9/1999

*Primary Examiner* — Victor L MacArthur
(74) *Attorney, Agent, or Firm* — Harness, Dickey & Pierce, P.L.C.

(57) ABSTRACT

A robot includes a base, an arm provided on the base, and a reducer having a sliding part and decelerating driving of the arm, wherein a lubricating oil can be supplied to the sliding part from an opposite side to the arm with respect to the sliding part.

10 Claims, 8 Drawing Sheets

(56) References Cited

U.S. PATENT DOCUMENTS

2013/0260606 A1* 10/2013 Hahakura .............. H01R 13/60
  439/534
2014/0320562 A1* 10/2014 Akiyama ............... B41J 2/2114
  347/16

* cited by examiner

ROBOT

BACKGROUND

1. Technical Field

The present invention relates to a robot.

2. Related Art

Research and development of robots having arms rotatable with respect to bases or the like are being carried out. The robots include reducers that adjust rotation speeds of the arms.

In this regard, a robot in which an oil supply port that enables supply of a lubricating oil for suppressing wear in a sliding part including a bearing, a gear, etc. of a reducer to the sliding part is provided in an outer wall part of an arm is known (see Patent Document 1 (JP-A-11-254377)).

However, it is assumed that the robot of related art is only installed on a floor and used with respect to oil supply. Accordingly, for example, when an environment in which the robot is suspended from a ceiling is used, the lubricating oil supplied within the reducer in which the sliding part is housed is harder to sufficiently spread over the sliding part and the sliding part may be deteriorated due to wear.

SUMMARY

A robot according to an aspect of the invention includes a base, an arm provided on the base, and a reducer having a sliding part and decelerating driving of the arm, wherein a lubricating oil can be supplied to the sliding part from an opposite side to the arm with respect to the sliding part.

According to this configuration, the robot can supply the lubricating oil to the sliding part from the opposite side to the arm with respect to the sliding part. Thereby, the robot may reduce wear of the sliding part by the lubricating oil supplied from the opposite side to the arm with respect to the sliding part.

Another aspect of the invention may be configured such that, in the robot, the lubricating oil can be supplied to the sliding part from a side of the arm with respect to the sliding part.

According to this configuration, the robot can supply the lubricating oil to the sliding part from the arm side with respect to the sliding part. Thereby, the robot may reduce wear of the sliding part by the lubricating oil supplied from the arm side with respect to the sliding part.

Another aspect of the invention may be configured such that the robot can be suspended from a ceiling.

According to the configuration, the robot can be suspended from the ceiling. Thereby, the robot can operate in the state where the robot is suspended from the ceiling.

In the robot, a configuration that can be placed on a floor may be used.

According to this configuration, the robot can be placed on a floor. Thereby, the robot can operate in the floor placement state.

Another aspect of the invention may be configured such that, in the robot, the base includes a first groove for preventing entrance of a fluid into the base, and a second groove for preventing entrance of a fluid between an object on which the base is installed and the base.

According to this configuration, the robot prevents entrance of a fluid into the base by the first groove and prevents entrance of a fluid between an object on which the base is installed and the base by the second groove. Thereby, the robot may suppress failures caused by entrance of the fluid into the base and between the object and the base.

As described above, the robot can supply the lubricating oil to the sliding part from the opposite side to the arm with respect to the sliding part. Thereby, the robot may reduce wear of the sliding part by the lubricating oil supplied from the opposite side with respect to the arm to the sliding part.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention are explained in the following order.

Figure 1A:
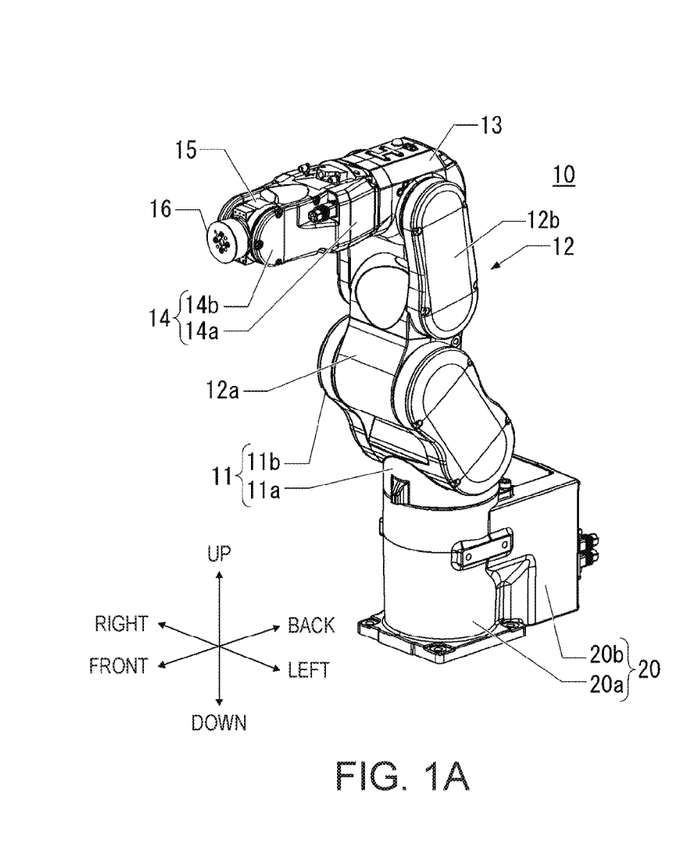
FIG. 1A shows a robot according to an embodiment of the invention.

(1) Configuration of Robot:
(2) Routing of Cable Routings in First Arm and Base:
(3) Configuration around Rotation Shaft Member:
(4) Another Embodiment 1:
(5) Another Embodiment 2:
(6) Another Embodiment 3:

(1) Configuration of Robot:

FIG. 1A shows a configuration of a robot 10 as one embodiment of the invention. The robot 10 according to the embodiment includes a plurality of arms 11 to 16 and a base 20. In the specification, the arms are numbered sequentially from the base 20 side for distinction. That is, the first arm 11 is rotatably supported by the base 20 and the second arm 12 is rotatably supported by the first arm 11. Further, the third arm 13 is rotatably supported by the second arm 12, the fourth arm 14 is rotatably supported by the third arm 13, the fifth arm 15 is rotatably supported by the fourth arm 14, and the sixth arm 16 is rotatably supported by the fifth arm 15. The rotations of the respective arms are realized by motors etc. (not shown) provided inside of the base 20 and the arms. Note that, in the embodiment, an end effector (not shown) can be attached to the sixth arm 16.

In FIG. 1A, the robot 10 is installed by placement of the base 20 in an installation location and fastening to the installation location with bolts or the like. In the specification, directions are coordinated with directions perpendicular to the plane on which the base 20 is installed are upward and downward directions and a direction in which the main drive ranges of the respective arms exist in the plane on which the base 20 is installed as a frontward direction and shown in FIG. 1A. Hereinafter, up, down, front, back, left, right are shown in reference to the directions shown in FIG. 1A.

The base 20 has a general shape in which a main body 20a in a nearly cylindrical shape and a rectangular part 20b in a rectangular shape are coupled. In FIG. 1A, the main body 20a is provided on the front side and the rectangular part 20b is provided on the back side. On the main body 20a, the first arm 11 is supported by the main body 20a so as to rotate about a rotation shaft extending in the up-to-down direction in FIG. 1A as a rotation center. The first arm 11 includes a main body 11a and a supporting part 11b, and is supported by the base 20 with the main body 11a disposed on the main body 20a of the base 20. The supporting part 11b is a part that sandwiches and supports the second arm 12. The second arm 12 includes a main body 12a and a supporting part 12b, and is supported by the supporting part 11b with the main body 12a sandwiched by the supporting part 11b so as to rotate about a rotation shaft extending in the right-to-left direction in FIG. 1A as a rotation center. The supporting part 12b is a part that sandwiches and supports the third arm 13.

The third arm 13 has a nearly rectangular parallelepiped shape and is supported by the supporting part 12b with the third arm 13 sandwiched by the supporting part 12b so as to rotate about a rotation shaft extending in the right-to-left direction in FIG. 1A as a rotation center. The fourth arm 14 is supported by an end surface of the third arm (an end surface on the front side in the state shown in FIG. 1A) so that the fourth arm 14 may rotate about a rotation shaft in parallel to a direction (a front-to-back direction in the state shown in FIG. 1A) perpendicular to the rotation shaft of the third arm 13 (in the right-to-left direction in the state shown in FIG. 1A).

The fourth arm 14 includes a main body 14a and a supporting part 14b, and is supported by the third arm 13 so that the main body 14a may rotate about a rotation shaft extending in the front-to-back direction in FIG. 1A as a rotation center. That is, in the embodiment, the direction in which the fourth arm 14 extends and the direction in which the rotation shaft extends are in parallel and the fourth arm 14 is twistable. The supporting part 14b is a part that sandwiches and supports the fifth arm 15. The fifth arm 15 is sandwiched by the supporting part 14b and supported by the supporting part 14b so as to rotate about a rotation shaft extending in the right-to-left direction in FIG. 1A as a rotation center. Further, the sixth arm 16 is supported by the fifth arm 15 so as to rotate about a rotation shaft extending in the front-to-back direction in FIG. 1A as a rotation center. That is, the sixth arm 16 is also adapted to be twistable.

A plurality of cable routings for transferring power, signals, fluids (air) to the other parts can be connected to the base 20. That is, these cable routings are connected to the base 20 and the cable routings are routed inside of the base 20, and thereby, power, signals, fluids, etc. are transferred to the base 20 and an arbitrary arm of the first arm 11 to the sixth arm 16 and used.

Figure 1B:
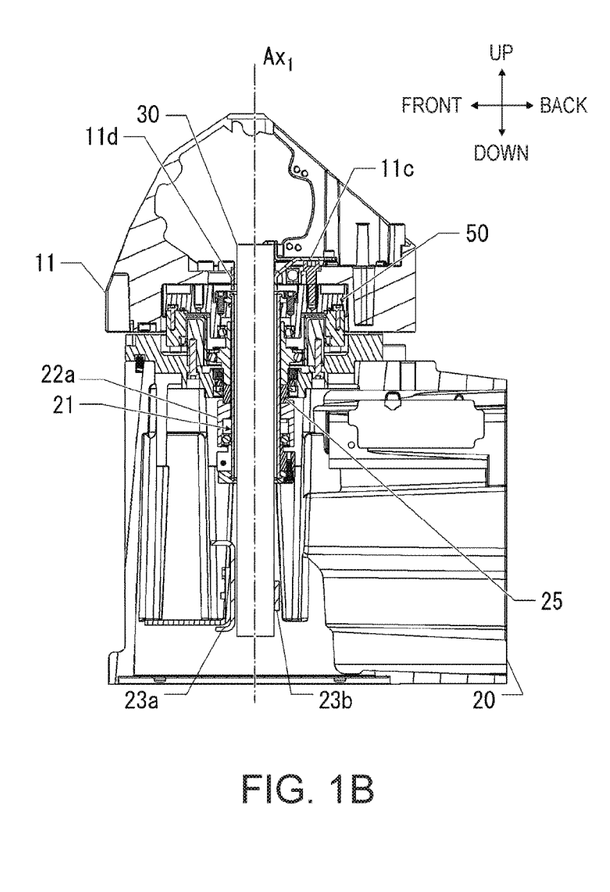
FIG. 1B is a sectional view of a base and a first arm.
Figure 2A:
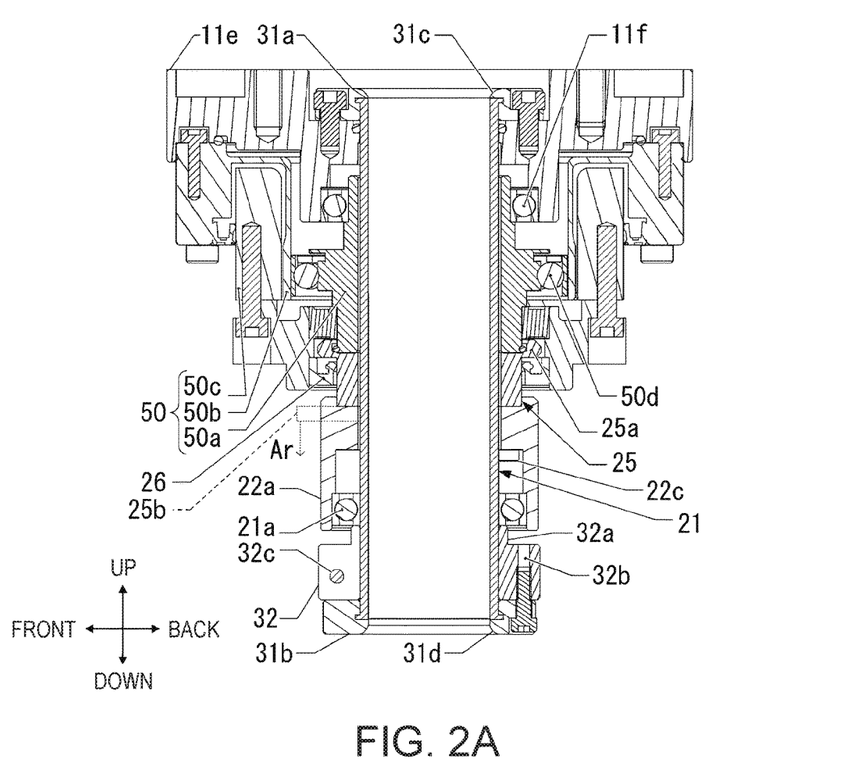
FIG. 2A is an enlarged sectional view around a reducer.

FIG. 1B is a sectional view of the base 20 and the first arm 11 cut in the front-to-back direction shown in FIG. 1A showing configurations inside of the base 20 and inside of the first arm 11 with respect to the rotation of the first arm (Note that only the lower part of the first arm 11 is extracted). Further, FIG. 2A is an enlarged view of extraction of members around a reducer 50 and a rotation shaft member 21. In the embodiment, the first arm 11 is provided on the upside of the base 20 in the vertical direction, and the first arm 11 is rotatably supported with respect to the center axis of the rotation shaft member 21 existing over the base 20 and the first arm 11. That is, the rotation shaft member 21 is a cylindrical member and provided within the base 20 and the first arm 11 so that the axis of the cylinder may be aligned with a rotation axis $Ax_1$ as a rotation center of the first arm 11.

A mechanism for transmitting a rotation drive force of the motor to the first arm 11 is provided around the rotation shaft member 21. In the embodiment, the mechanism includes a rotation shaft member pulley 22a, a detachable member 25, and the reducer 50. Note that, in the embodiment, the reducer 50 is a strain wave gearing including a wave generator 50a, a flexspline 50b, and a circular spline 50c.

The rotation shaft member pulley 22a has an inner diameter slightly larger than the outer diameter of the rotation shaft member 21, and attached to the side slightly below the center in the up-to-down direction of the rotation shaft member 21 via a bearing 21a. The rotation shaft member pulley 22a rotates by the rotation drive force of the motor (not shown) provided within the base 20. That is, a belt is looped over the rotation shaft member pulley 22a and the belt is looped over a motor pulley (not shown). The motor pulley is coupled to the output shaft of the motor and the motor is rotationally driven, and thereby, the rotation drive force is transmitted to the rotation shaft member pulley 22a via the motor pulley and the belt. Note that, in FIG. 1B, the motor and the motor pulley are omitted, however, the motor and the motor pulley are provided in the rectangular part 20b (see FIG. 1A) within the base 20.

The rotation speed of the first arm 11 in the embodiment is adjusted by the reducer 50 to rotate at a rotation speed appropriate for the rotation of the first arm 11. That is, in the embodiment, the rotation shaft member pulley 22a is coupled to the detachable member 25 by a bolt 22c, and the detachable member 25 is coupled to the wave generator 50a by the bolt 22c. Therefore, the rotation shaft member pulley 22a, the detachable member 25, and the wave generator 50a integrally rotate, not relatively rotate.

The wave generator 50a includes a bearing 50d and the flexspline 50b is attached to the outer circumference side of the bearing 50d. The flexspline 50b is adapted to mesh with the circular spline 50c. Note that the circular spline 50c is fixed to the base 20 by a bolt. Further, the flexspline 50b is fixed to a flange 11e by a bolt. The flange 11e is a component member of the first arm 11 and fixed to the main body 11a of the first arm 11 by a bolt.

The outer circumference of the wave generator 50a has an oval shape (the outer circumference as seen from above to below has the oval shape). The flexspline 50b has a part in a cylindrical shape with a thin wall surface, and the wave generator 50a is attached to be fitted in the inner circumference of the wall surface. Accordingly, when the wave generator 50a rotates about the rotation axis $Ax_1$ as a rotation center, the shape of the thin wall surface of the flexspline 50b elastically deforms according to the shape of the outer circumference of the wave generator 50a. Teeth are provided on the outer circumference of the flexspline 50b, and teeth are also provided on the inner circumference of the circular spline 50c. Therefore, the flexspline 50b meshes with the circular spline 50c in the long axis parts of the oval shape. Further, the difference in number of teeth between the splines is n (n is a natural number equal to or more than one). Therefore, when the wave generator 50a makes one revolution, the oval makes one revolution while the flexspline 50b meshes with the circular spline 50c in the long axis parts of the oval, and the wave generator 50a and the flexspline 50b relatively rotate by an angle according to the difference in number of teeth in one revolution of the oval. In the embodiment, according to the above described configuration, the reducer 50 rotates the flexspline 50b while reducing the rotation speed of the wave generator 50a.

In the embodiment, according to the above described configuration, the first arm 11 is rotated by the rotation drive force of the motor. That is, when the rotation shaft member pulley 22a rotates by the rotation drive force of the motor, the detachable member 25 and the wave generator 50a coupled to the rotation shaft member pulley 22a integrally rotate. As described above, when the wave generator 50a rotates, the rotation is transmitted to the flexspline 50b while the rotation is decelerated, however, the flexspline 50b couples to the flange 11e and the flange 11e (i.e., the first arm 11) rotates about the rotation axis $Ax_1$ as a rotation center at the number of revolutions after the deceleration.

Note that, in the embodiment, the rotation shaft member 21 is fixed to the flange 11e using the upper end portion of the rotation shaft member 21. Specifically, the rotation shaft member 21 has upper end and lower end portions slightly projecting in directions perpendicular to the up-to-down direction to form flangelike parts. Annular cable routing protective members 31a, 31b are attached to the projecting parts. These cable routing protective members 31a, 31b have inner diameters slightly larger than the outer diameter of the rotation shaft member 21, and grooves in which the upper end and lower end flangelike parts of the rotation shaft member 21 can be inserted are formed on the wall surfaces forming the inner diameters.

Further, bolt holes penetrating in directions in parallel to the inner walls are formed in the cable routing protective members 31a, 31b, and the cable routing protective member 31a is fixed to the flange 11e via the bolt holes on the upper end of the rotation shaft member 21. Therefore, the rotation shaft member 21 rotates with the rotation of the flange 11e. Obviously, the configuration is an example, and the rotation shaft member 21 may be directly fixed to the flange 11e.

On the other hand, the cable routing protective member 31b is fixed to a drop prevention member 32 via the bolt holes on the lower end of the rotation shaft member 21. The drop prevention member 32 has a cylindrical shape and a projecting port ion 32a projecting upward. The drop prevention member 32 has a bolt hole 32b in which a bolt can be inserted in the up-to-down direction and a bolt hole 32c in which a bolt can be inserted in a direction perpendicular to the up-to-down direction. The bolt is inserted into the bolt hole 32c with the upper end of the projecting portion 32a in contact with the lower end of the bearing 21a, and thereby, the drop prevention member 32 is fixed to the rotation shaft member 21. Further, the bolt is inserted into the bolt hole 32b, and thereby, the drop prevention member 32 is fixed to be integrated with the cable routing protective member 31b.

Note that, in the state in which the cable routing protective members 31a, 31b are fixed to the rotation shaft member 21, parts 31c, 31d located on the upper end of the inner wall of the cable routing protective member 31a and the lower end of the inner wall of the cable routing protective member 31b are curved surfaces having inner diameters gradually larger toward the outside (the upper end side or the lower end side).

(2) Routing of Cable Routings in First Arm and Base:

In the above described configuration, the shaft of the rotation shaft member 21 penetrates the hollow shaft of the reducer 50, and the axis of the rotation shaft member 21, the axis of the reducer 50, and the rotation axis $Ax_1$ of the first arm 11 are aligned. In the embodiment, the rotation shaft member 21 is provided inside of the base 20 and the first arm so that the rotation axis $Ax_1$ may be parallel to the up-to-down direction (the vertical direction when the base 20 is installed on the horizontal surface). That is, the reducer 50 according to the embodiment has the hollow shaft and the rotation shaft member 21 penetrates the hollow shaft of the reducer 50.

In the embodiment, the above described cable routings 30 pass through the hollow part of the rotation shaft member 21. That is, as shown in FIGS. 1B and 2A, the rotation shaft member 21 is a hollow tubular member and the cable routings 30 pass through the hollow part inside (see FIG. 1B). Therefore, the cable routings 30 exist over the base 20 and the first arm 11. The cable routings 30 are cable routings routed inside of the base 20 and inside of the first arm 11 and the cable routings for transferring power, signals, fluids, etc. from the outside to the inside or from the inside to the outside of the base 20 are bundled.

The cable routings 30 are bundled at least in a location inside of the base 20 and at least in a location inside of the first arm 11. In the embodiment, the cable routings are bundled in a first bundle position existing on the rotation axis $Ax_1$ and inside of the base 20 and in a second bundle position existing on the rotation axis $Ax_1$ and inside of the first arm 11. There is no other bundle position between the first bundle position and the second bundle position. Specifically, as shown in FIG. 1B, a plate-like member 23a is coupled to the base 20 in the lower part within the base 20. Further, a bundling tool 23b that can be fastened to the plate-like member 23a while being in contact with a part of the outer circumference of the cable routings 30 and the plate-like surface of the plate-like member 23a is formed in advance, and the bundling tool 23b is fastened to the plate-like member 23a with the cable routings 30 placed between the plate-like member 23a and the bundling tool 23b. As a result, the cable routings 30 are bundled inside of the base 20 in a position of the bundling tool 23b as the above described first bundle position.

On the other hand, as shown in FIG. 1B, a plate-like member 11c is coupled to the first arm 11 in the lower part of the first arm 11. Further, a bundling tool 11d that can be fastened to the plate-like member 11c while being in contact with a part of the outer circumference of the cable routings 30 and the plate-like surface of the plate-like member 11c is formed in advance, and the bundling tool 11d is fastened to the plate-like member 11c with the cable routings 30 placed between the plate-like member 11c and the bundling tool 11d. As a result, the cable routings 30 are bundled inside of the first arm 11 in a position of the bundling tool 11d as the above described second bundle position. Obviously, the bundling method in the first bundle position and the second bundle position is an example, and another method may be used. For example, the cable routings 30 may be sandwiched by a plate-like member so that the cable routings 30 may be bundled by the action of a plate spring.

In the embodiment, the plate-like member 23a, the bundling tool 23b, the plate-like member 11c, and the bundling tool 11d are provided in positions in which the cable routings 30 may be bundled on the rotation axis $Ax_1$ of the rotation shaft member 21. Therefore, in the embodiment, the cable routings 30 are bundled in the first bundle position and the second bundle position on the rotation axis $Ax_1$. Further, the rotation axis $Ax_1$ is a straight line, and the cable routings 30 takes a linear shape between the first bundle position and the second bundle position.

Note that, in the embodiment, the part near the rotation shaft of the reducer 50 is hollow and the rotation shaft member 21 is provided in the hollow part. The rotation shaft member 21 is the cylindrical member, and thereby, the cable routings 30 are easily placed on the rotation axis $Ax_1$ by passing the cable routings through the rotation shaft member 21. Further, in the embodiment, the rotation axis $Ax_1$ is parallel to the vertical direction. Therefore, even when the cable routings 30 are bundled in the first bundle position and the second bundle position as two positions on the rotation axis $Ax_1$, the cable routings 30 existing between the first bundle position and the second bundle position are placed on the rotation axis $Ax_1$ under their own weight. Accordingly, the cable routings 30 autonomously takes the linear shape. Therefore, the lifetime of the cable routings 30 may be elongated by a simple configuration.

In the above described configuration, when the first arm 11 rotates relative to the base 20, the cable routings 30 are twisted with the rotation of the first arm 11. However, in the embodiment, there is no crankshaft that pulls the first arm 11 with the rotation, and the cable routings 30 is not pulled by a component serving as the crankshaft. Therefore, compared to the structure in which a pulling force by the crankshaft acts, most of the force acting on the cable routings 30 may be limited to stress due to twist. As a result, the lifetime of the cable routings 30 can be elongated.

Further, in the embodiment, the cable routing protective members 31a, 31b are attached to the upper end portion and the lower end portion of the rotation shaft member 21, and the parts 31c, 31d located on the upper end of the inner wall of the cable routing protective member 31a and the lower end of the inner wall of the cable routing protective member 31b are curved surfaces having inner diameters gradually larger from the inside toward the outside (from the inside toward the upper end side or from the inside toward the lower end side). Therefore, the contact surfaces on which the cable routings 30 are in contact with the parts near the upper end and the lower end of the rotation shaft member 21 are the curved surfaces, and the extent at which the cable routings 30 are broken when the cable routings 30 come into contact with the cable routing protective members 31a, 31b is suppressed. Therefore, the lifetime of the cable routings 30 can be elongated.

Furthermore, the parts 31c, 31d of the cable routing protective members 31a, 31b and the inner wall of the rotation shaft member 21 may be coated with a material having a relatively small friction resistance, e.g. fluorine resin or the like. According to the configuration, the extent at which the cable routings 30 are broken due to contact with the cable routings 30 may be suppressed. Therefore, the lifetime of the cable routings 30 can be elongated.

The first bundle position and the second bundle position are not limited to the positions shown in FIGS. 1B and 2A, but may be changed according to the lifetime of the cable routings 30. That is, the distance between the first bundle position and the second bundle position is increased, and thereby, the lifetime of the cable routings 30 may be elongated.

(3) Configuration Around Rotation Shaft Member:

The cable routings 30 within the base 20 are generally thicker (bundled and become thicker) than the cable routings within the other arms. Therefore, to allow the thick cable routings 30 to pass through the rotation shaft member 21, it is necessary that the inner diameter of the rotation shaft member 21 is sufficiently large. Further, as described above, to elongate the lifetime of the cable routings 30, it is necessary to increase the distance between the first bundle position and the second bundle position.

To place a tubular rotating member to rotate about a rotation axis, generally, the member may be held in two locations of the tube, however, in the embodiment, to place the thick and long rotation shaft member 21 within the base 20, the rotation shaft member 21 is held in three locations, i.e., by the bearings 21a, 50d, 11f. Here, the bearings 50d, 11f have structures not dropping in relation to surrounding parts, however, unless another member is provided immediately under the bearing 21a, the bearing 21a could drop due to the rotation of the rotation shaft member pulley 22a. Accordingly, in the embodiment, as shown in FIG. 2A, the drop prevention member 32 is attached to the rotation shaft member 21 below the rotation shaft member pulley 22a in the vertical direction. The drop prevention member 32 is attached to the rotation shaft member 21 so that the projecting portion 32a projecting upward may be in contact with the bearing 21a (at least a component element of the bearing 21a). Here, the drop prevention member 32 is fixed to the rotation shaft member 21 by the bolt hole 32c, and thereby, even when the rotation shaft member 21 rotates at a high speed, the drop prevention member 32 does not drop downward. Therefore, the drop prevention member 32 acts to prevent drop of the bearing 21a of the rotation shaft member pulley 22a.

Further, the above described detachable member 25 is used in combination with a sealing member 26 for preventing leakage of the lubricating oil, and thereby, the leakage of the lubricating oil within the reducer 50 may be prevented without disassembly of the reducer 50. That is, in the embodiment, the sealing member 26 is not directly attached to the wave generator 50a, but attached to the detachable member 25 with the detachable member 25 placed between the sealing member 26 and the wave generator 50a.

In other words, the reducer 50 is formed by a combination of a plurality of movable components, and the lubricating oil is enclosed inside so that the respective movable components may smoothly move in contact with one another. The sealing member 26 is used for preventing leakage of the lubricating oil, and, to prevent drop of the sealing member 26 in the operation process while using the detachable member 25, it is necessary that the sealing member 26 is strongly attached to the reducer 50. However, in the configuration in which the sealing member 26 is directly and strongly attached to the reducer 50, it is difficult to detach the sealing member 26 singly for maintenance and disassembly of the reducer 50 is required.

Accordingly, in the embodiment, the detachable member 25 is adapted to be detachable from the reducer 50. That is, in the above described detachable member 25 is an annular member detachable from the reducer 50 and attached to the reducer 50 with the rotation shaft member 21 penetrating therein. Specifically, a lug portion 25a is formed in the upper part of the detachable member 25, and the lug portion 25a is attached to bite into the outer wall of the wave generator 50a. The detachable member 25 is attached to the wave generator 50a, and then, the annular sealing member 26 for preventing leakage of the lubricating oil within the reducer 50 is attached between the outer wall of the detachable member 25 and the base 20. The sealing member 26 can be fitted so that the lubricating oil within the reducer 50 may not leak downward with respect to the detachable member 25. According to the configuration, the leakage of the lubricating oil of the reducer 50 can be prevented by the sealing member 26 in the operation process.

Figure 2B:
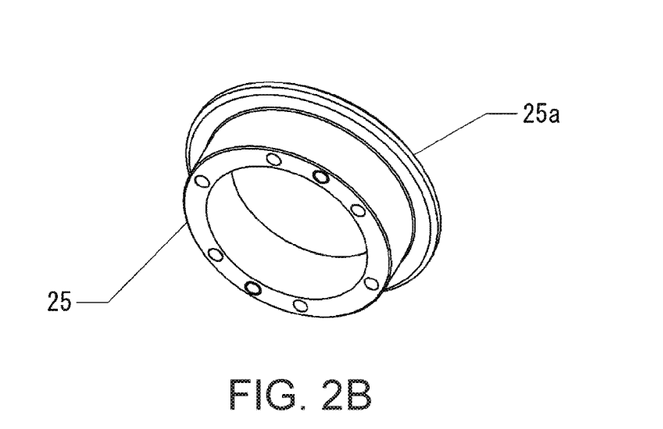
FIG. 2B is a perspective view of a detachable member.

It is only necessary that the detachable member 25 is detachable from the wave generator 50a, and various techniques can be employed as the technique for attachment and detachment. In the embodiment, detachment is performed by attachment of another component to the detachable member 25. For example, the detachable member 25 can be detached using a plate-like member 25b with bolt holes formed therein (see a broken line in FIG. 2A). That is, the detachable member 25 has a plurality of bolt holes as shown in FIG. 2B and, when a force in a direction of an arrow Ar acts on the plate-like member 25b with coupling to the plate-like member using the bolt holes and the bolt holes formed in the plate-like member 25b, the detachable member 25 can be detached with the sealing member 26. According to the above described configuration, the detachable member 25 and the sealing member 26 can be detached from the reducer 50 without disassembly of the reducer 50. Note that it is preferable that the sealing member 26 is a rubber member with high heat resistance formed using e.g. a fluorine resin or the like because the member rotates with the detachable member 25.

(4) Another Embodiment 1:

The above described embodiment is an example for embodying the invention, and other various configurations can be employed. For example, the form of the robot 10 is not limited to the embodiment shown in FIG. 1A, but may be any other robot such as a dual-arm robot, a humanoid robot, or a scalar robot. Obviously, the configuration of the arm is not limited to the form shown in FIG. 1A. A seven-axis robot including seven arms may be employed and the number of arms is not limited.

Figure 3A:
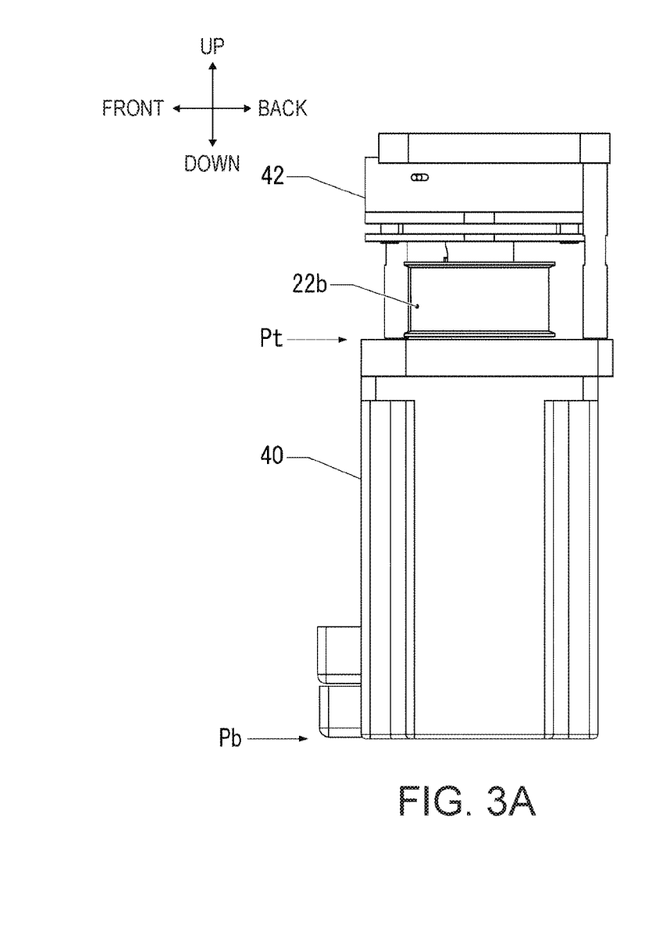
FIG. 3A shows a motor and FIG. 3B is a sectional view of the motor.
Figure 3B:
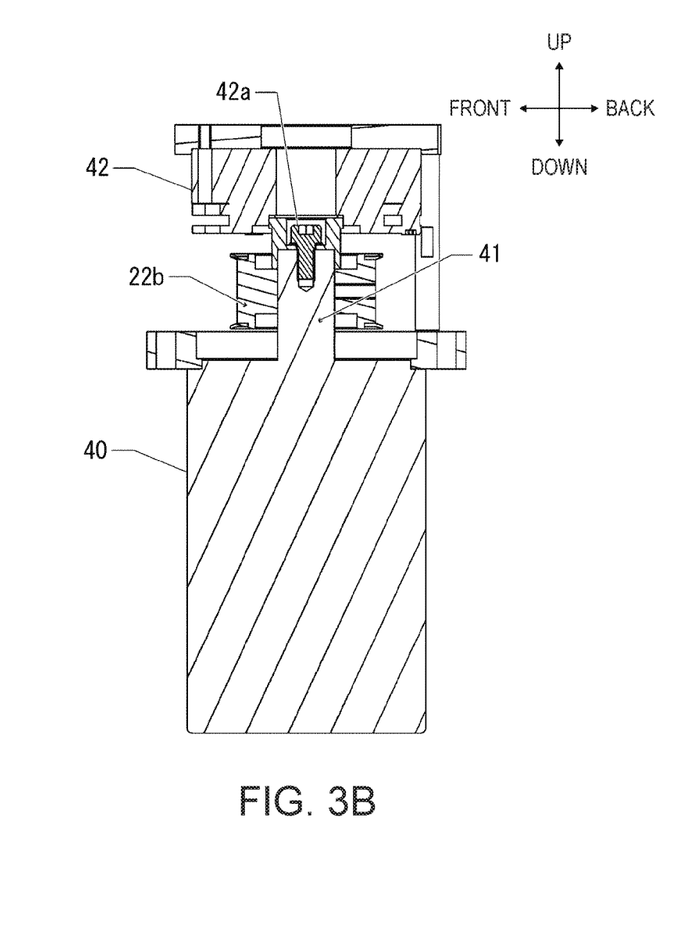

Further, various inventions may be applied to various components provided in the base 20 of the robot 10. In many cases, it is preferable that the robot 10 has a smaller size than a large size, and an invention for downsizing may be applied. For example, the base 20 can be downsized by providing brakes of the motors within the base 20 in arrangement different from the normal arrangement. FIGS. 3A and 3B extract and show a motor 40 provided in the base 20 and members relating to the motor 40. FIG. 3A shows the motor 40 within the base 20 as seen from the left side to the right side shown in FIG. 1A, and FIG. 3B is a sectional view of FIG. 3A. In these drawings, the similar configurations to those of the robot 10 shown in FIG. 1A are shown by the same signs.

The motor 40 shown in FIGS. 3A, 3B includes a casing elongated in one direction and is attached within the base 20 with the longitudinal direction in the up-to-down direction. The motor 40 includes an output shaft 41 projecting upward in the vertical direction, and a motor pulley 22b is attached to the output shaft 41. Further, a belt (not shown) is looped over the motor pulley 22b, and the rotation of the motor pulley 22b is transmitted to the rotation shaft member pulley 22a via the belt.

A motor brake 42 that suppresses the rotation of the output shaft 41 is attached to the upper end of the output shaft 41. In the embodiment, the motor brake 42 is attached to the upper end of the output shaft 41 with a bolt 42a and cable routings as a communication line and a power line (not shown) are attached thereto. That is, when a signal as a command of suppressing the rotation of the output shaft 41 is transmitted to the motor brake 42 by the cable routings, the motor brake 42 is driven by the power and allows a friction force to act on the member coupled to the output shaft 41. As a result, the rotation of the output shaft 41 is suppressed. According to the configuration, in the robot 10, the rotation of the output shaft 41 in the motor 40 can be stopped (or the rotation can be suppressed) at an arbitrary time.

On the other hand, in a motor of related art, a motor brake is attached to a main body of the motor. For example, in the motor with the longitudinal direction in the up-to-down direction as shown in FIG. 3A, the motor brake is attached to a bottom surface of the motor main body (position Pb shown in FIG. 3A) or an upper surface of the motor main body (position Pt shown in FIG. 3A). In this case, the height of the motor pulley 22b is forced to move upward by the height of the motor brake.

In the configuration in which the rotation drive force of the motor 40 is transmitted to the first arm 11 via the motor pulley 22b, the rotation shaft member pulley 22a, and the belt, the motor 40 may be provided in the lower part in the vertical direction and the first arm 11 may be provided in the upper part in the vertical direction with the belt in between (for example, in the configuration shown in FIGS. 1A, 1B, the first arm 11 is provided in the upper part of the reducer 50 and the motor 40 is provided in the rectangular part 20b of the base 20). According to the configuration, the first arm 11 (reducer 50) and the motor 40 are not aligned on the vertical line, and the space below the first arm 11 can be used as a space in which the other components than the motor 40 exist. Accordingly, the length of the cable routings 30 existing over the first arm 11 and the base 20 extending along the rotation axis $Ax_1$ can be made longer. As the length in which the cable routings 30 linearly extend is longer, aged deterioration when the cable routings 30 are twisted may be further suppressed and the lifetime of the cable routings 30 may be further elongated.

In the above described configuration, the reducer and the first arm 11 are provided in positions not immediately above the motor 40. Therefore, even when a member smaller than the reducer 50 is provided above the motor 40, the total height of the base 20 is unchanged. Further, the motor brake 42 smaller than the reducer 50 is easily formed, and thereby, as shown in FIGS. 3A and 3B, the base 20 including the motor brake 42 may be formed without increase in the size of the base 20 by the configuration including the motor brake 42 above the motor pulley 22b in the vertical direction. Note that, as the motor brake 42, various configurations can be employed and brakes of known various systems can be configured.

Further, shortening of the lifetime of the cable routings may be prevented by managing the cable routings within the base 20. For example, in the robot 10 including the drive parts (motor, pulley, rotation shaft member, etc.) existing inside of the base 20 for rotating the first arm 11, the base 20 may include an opening part and a cover attachable to the opening part, the cover may include a cable routing connecting part for connecting the cable routings 30 existing inside of the base 20 to a connection destination outside of the base 20, the cable routings 30 may include a pipe for flowing a fluid, the cable routing connecting part may include a joint to which the pipe is connected, and the drive parts may not exist in the extension destination of the joint in the cover attached to the opening part.

Figure 4A:
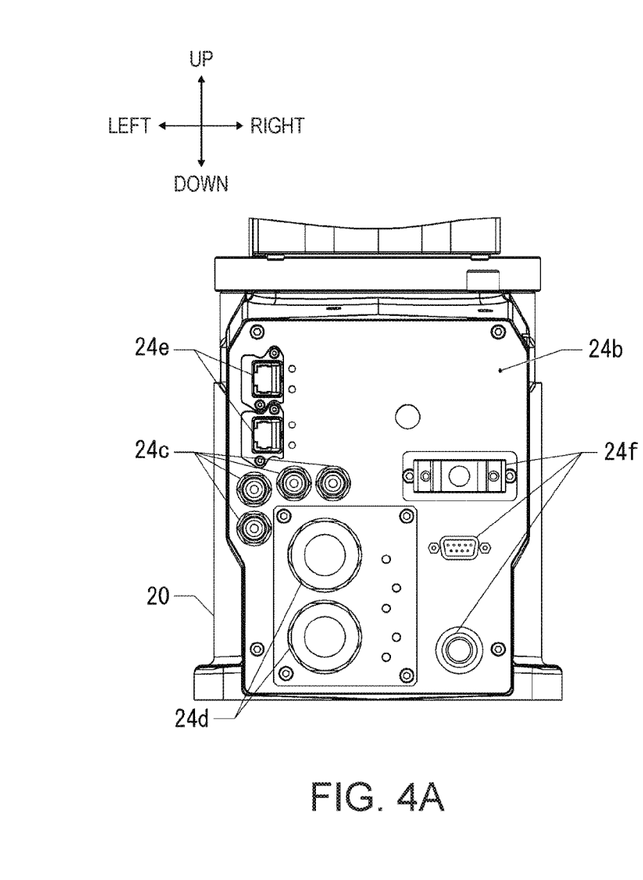
FIG. 4A shows the base and FIG. 4B shows an interior of the base.
Figure 4B:
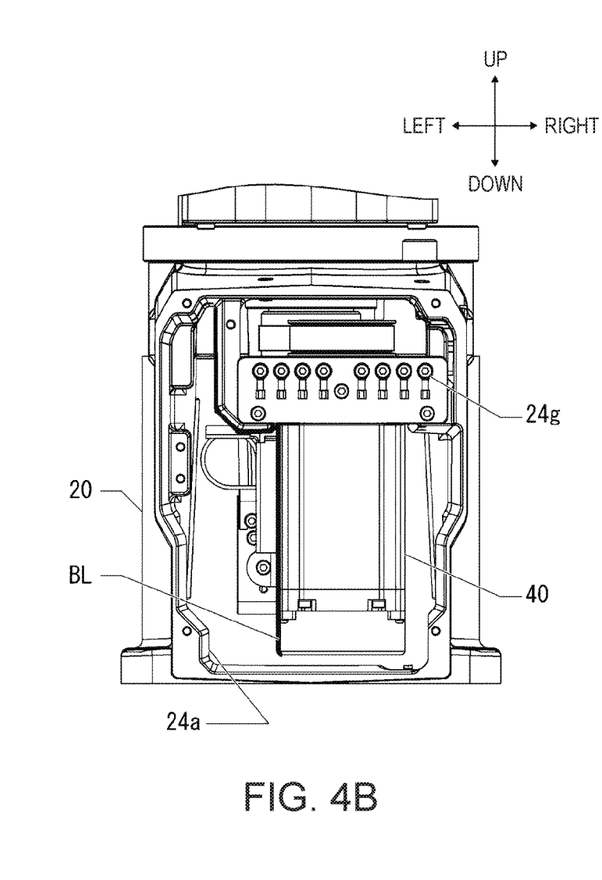

FIGS. 4A and 4B show the base 20 as seen from the rear. In the base 20 shown in the drawings, an opening part 24a is formed in the rear surface. Further, a cover 24b that covers the opening part 24a can be attached to the base 20. A plurality of cable routing connecting parts 24c to 24f are attached to the cover 24b. The respective cable routing connecting parts 24c to 24f are attached to extend in the perpendicular direction to the flat surface of the cover 24b. Note that the cable routing connecting part 24c is a joint to which a pipe is connected, the cable routing connecting part 24d is a connector to which a power line is connected, and the cable routing connecting part 24e is a connector to which a communication line is connected. The cable routing connecting part 24f is a connector for a cable routing not used in the operation process of the robot 10, a connector for a cable routing for which bending of the cable routing is not significantly problematic (cable routings separately existing, not bundled cable routings or the like), or the like.

The base 20 has the drive parts including the motor 40 etc. inside. The main section of the drive parts is covered by a plate or the like and, in FIG. 4B, a boundary of the drive parts existing on the side of the cable routing connecting parts 24c to 24d is shown by a thick line BL. If the cable routings 30 come into contact with the drive parts, the cable routings 30 may be broken due to driving of the drive parts and the lifetime may be shorter. Or, in a state in which the cover 24b is attached to the opening part 24a, if the drive parts exist in the extension destination of the cable routing connecting parts (in the extension destination of the cable routings to the cable routing connecting parts in the connection direction), it is necessary to bend the cable routings 30 within the base 20 to avoid the drive parts.

Accordingly, in the embodiment, the drive parts are adapted not to exist in the extension destination of the cable routing connecting parts 24c to 24e (when the cable routing connecting parts 24c to 24e are projected on FIG. 4B, the projected figures are on the left side of the thick line BL). On this account, the cable routings 30 connected to the cable routing connecting parts 24c to 24e are not largely bent for avoiding an interference with the drive parts inside of the base 20 or the like. Accordingly, it is possible to prevent shortening of the lifetime of the cable routings 30. Note that it is difficult to sharply bend the pipe as the cable routings for securing the flow of the fluid within the pipe. Therefore, the effect is significant by the application of the configuration of the embodiment in which the drive parts do not exist in the extension destination of the cable routing connecting parts to the cable routing connecting part 24c connecting the pipe.

Note that the cable routing connecting parts for connecting the cable routings for which an interference with the drive parts is hard to be assumed may be attached to the cover 24b in a state in which the drive parts may exist in the extension destination. For example, the cable routing connecting part 24f shown in FIG. 4A is a connector for a cable routing not used in the operation process of the robot 10, a connector for a cable routing for which bending of the cable routing is not significantly problematic, or the like. That is, in the former case, even when the drive parts exist in the extension destination of the cable routing connecting parts, the cable routings do not interfere with the drive parts. Or, in the latter case, the degree of freedom of routing of the cable routings is higher and the cable routings may be routed to avoid the drive parts. Further, the cable routings connected to the component elements of the drive parts are not necessarily formed so that the drive parts may not exist in the extension destination of the cable routing connecting parts. For example, the cable routing connecting parts of the cable routings connecting to a connector 24g of the ground wire as shown in FIG. 4B may be attached to the cover 24b so that the connector 24g and the drive parts may exist in the extension destination.

(5) Another Embodiment 2:

The above described embodiments can employ various configurations explained here. Further, the various configurations explained here may be applied to different configurations from those of the above described embodiments. Here, as an example of the various configurations, the case where the robot 10 can be suspended from a ceiling is explained. In the example, the suspension refers to installation of the robot 10 (base 20) on a ceiling. In this case, when a lubricating oil for reducing wear of sliding parts including the flexspline 50b, the gear of the circular spline 50c, the bearing 50d, etc. within the reducer 50 of the base 20 is supplied from the first arm 11 side (if the first arm 11 is not connected to the base 20, the side to which the first arm 11 is connected, and the same applies hereinafter) with respect to the sliding parts into the reducer 50, the lubricating oil may accumulate on the first arm 11 side due to the gravity force and not sufficiently spread over the sliding parts.

Figure 5:
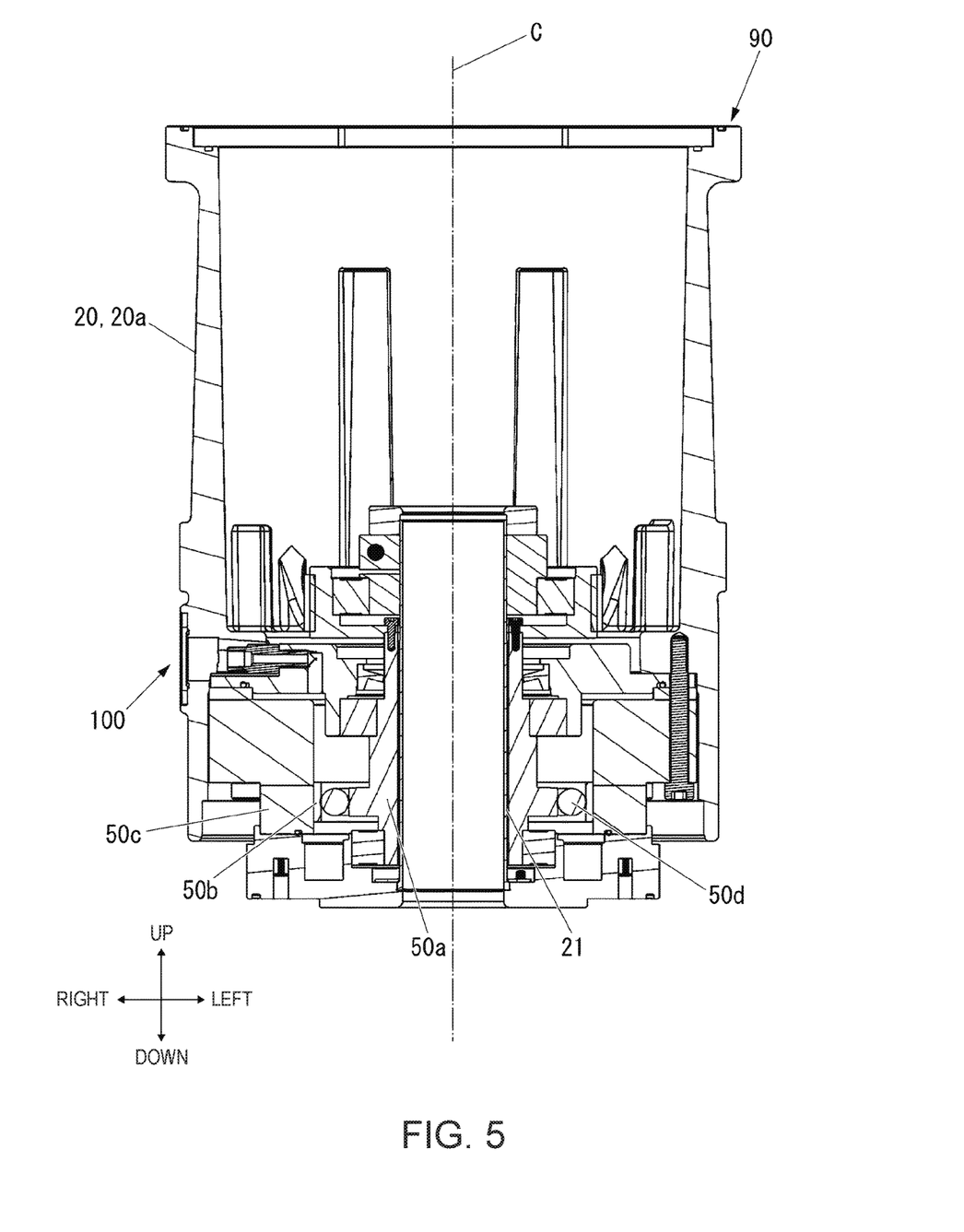
FIG. 5 shows an example of a base 20 including an oil supply port 100.

To resolve the problem, the base 20 may include an oil supply port 100, which will be described in FIG. 5. FIG. 5 shows an example of the base 20 including the oil supply port 100. The sectional view shown in FIG. 5 is a sectional view of the main body 20a of the base 20 of the suspended robot 10 cut in the right-to-left direction shown in FIG. 1A.

Hereinafter, for convenience of explanation, a surface attached to an object as an installation location (e.g. a ceiling, a floor, or the like) of the robot 10 (base 20) is referred to as "attachment surface 90". In the example, the attachment surface 90 is a surface in the base 20 on the opposite side to the first arm 11 with respect to the reducer 50. As shown in FIG. 5, the robot 10 is suspended from the ceiling, and the up-and-down relationship between the reducer 50 and the attachment surface 90 is inverted to the up-and-down relationship between the reducer 50 and the attachment surface 90 shown in FIG. 2A.

The base 20 shown in FIG. 5 includes the oil supply port 100 from which the lubricating oil can be supplied to the sliding parts from the opposite side to the first arm 11 (in the example, the attachment surface 90 side) with respect to the sliding parts inside of the reducer 50. That is, when the robot 10 (base 20) is suspended from the ceiling, the oil supply port 100 is located above the sliding parts as shown in FIG. 5. Accordingly, the lubricating oil supplied from the oil supply port 100 flows from the opposite side to the first arm 11 sequentially through the sliding parts toward the first arm 11 side inside of the reducer 50. Thereby, even when suspended from the ceiling, the robot 10 may reduce wear of the sliding parts by the lubricating oil supplied from the opposite side to the first arm 11 with respect to the sliding parts.

As described above, from the oil supply port 100, the lubricating oil may be sufficiently spread over the sliding parts when the robot 10 is suspended from the ceiling, however, it may be impossible that the lubricating oil is sufficiently spread over the sliding parts when the robot 10 is placed on the floor. This is because, when the robot 10 is placed on the floor, the lubricating oil supplied from the oil supply port 100 accumulates on the opposite side to the first arm 11 (in the example, the attachment surface 90 side) inside of the reducer 50 due to the gravity force. Note that, in the example, the floor placement refers to installation of the robot 10 (the attachment surface 90 of the base 20) on the floor.

Figure 6:
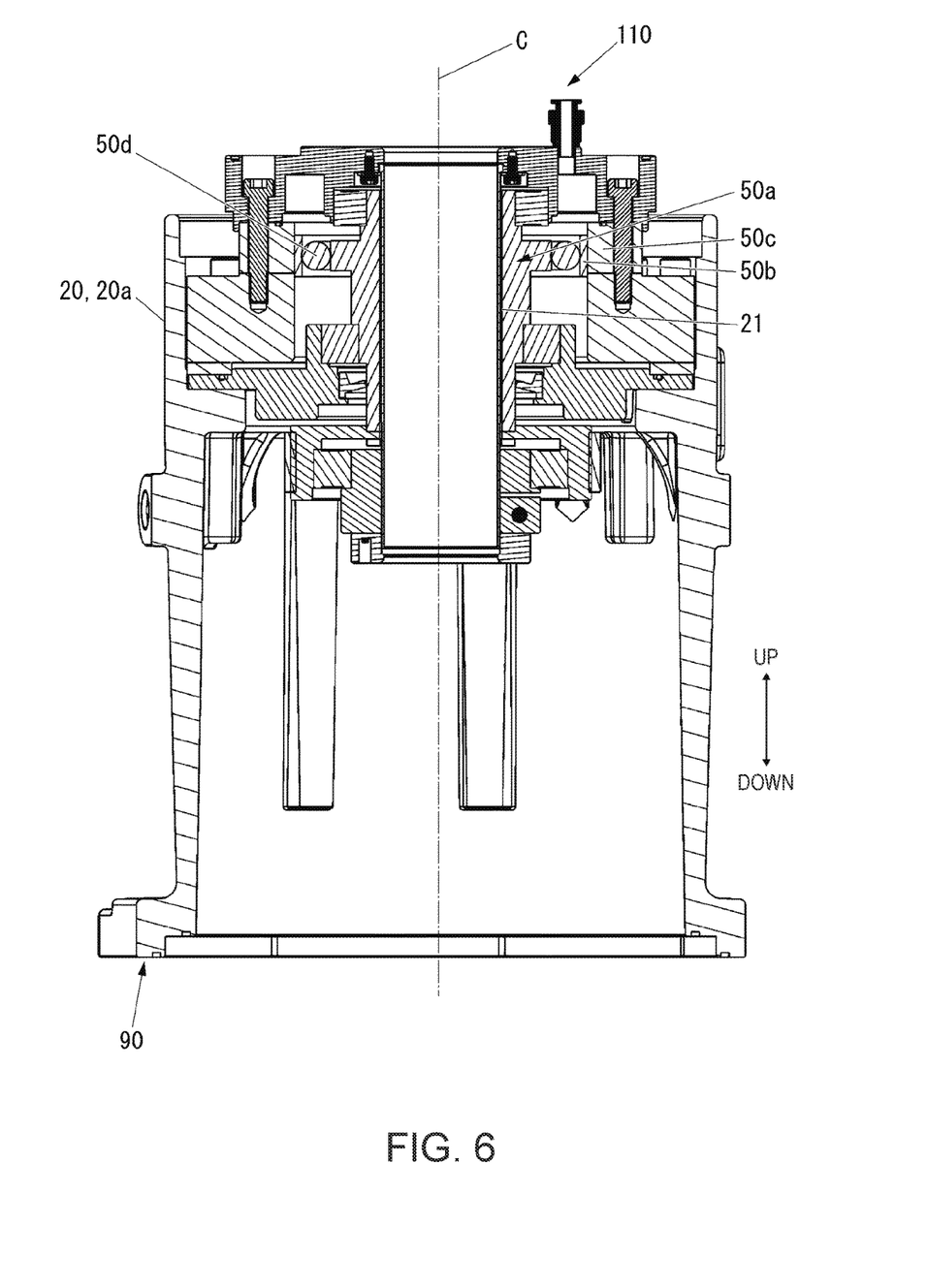
FIG. 6 shows an example of the base 20 including an oil supply port 110.

Accordingly, the base 20 of the robot 10 may include an oil supply port 110 shown in FIG. 6 in addition to the oil supply port 100 shown in FIG. 5. FIG. 6 shows an example of the base 20 including the oil supply port 110. The sectional view shown in FIG. 6 is a sectional view of the main body 20a of the base 20 of the robot 10 placed on the floor cut in a section different from the section shown in FIG. 5. As shown in FIG. 6, the robot 10 is placed on the floor, and the up-and-down relationship between the reducer 50 and the attachment surface 90 is inverted to the up-and-down relationship between the reducer 50 and the attachment surface 90 shown in FIG. 5.

In the example, as shown in FIG. 6, the base 20 includes the oil supply port 110 from which the lubricating oil can be supplied to the sliding parts from the first arm 11 side with respect to the sliding parts inside of the reducer 50 in addition to the oil supply port 100 shown in FIG. 5. That is, when the robot 10 is placed on the floor, the oil supply port 110 is located above the sliding parts as shown in FIG. 6. Accordingly, the lubricating oil supplied from the oil supply port 110 flows from the first arm 11 side sequentially through the sliding parts toward the opposite side to the first arm 11 (in the example, the attachment surface 90 side) with respect to the sliding parts inside of the reducer 50. Thereby, even when placed on the floor, the robot 10 may reduce wear of the sliding parts by the lubricating oil supplied from the first arm 11 side with respect to the sliding parts. Note that the section of the base 20 shown in FIG. 6 is different from the section of the base 20 shown in FIG. 5, and the oil supply port 100 is hidden in FIG. 6.

Further, in the case where the base 20 includes both the oil supply port 100 and the oil supply port 110, the robot 10 may reduce wear of the sliding parts in both being suspended from the ceiling and placed on the floor. As a result, in the case where the user installs the robot 10 on either the ceiling or the floor according to the work desired to be performed by the robot 10, the lubricating oil may be sufficiently spread over the sliding parts. That is, the robot 10 has higher versatility.

In the base 20 according to the embodiment, as an example, the oil supply port 100 is provided in a position on the opposite side to the side on which the arm is provided with respect to the sliding parts in the gravity direction. Accordingly, in an installation environment in which the arm is provided in the lower part with respect to the sliding parts in the gravity direction, the lubricating oil may be supplied from the oil supply port 100 located in the upper part with respect to the sliding parts in the gravity direction, and thereby, the lubricating oil may be easily spread over the sliding parts. In this case, for example, the attachment surface 90 of the base 20 on the opposite side to the arm is installed on the ceiling and the robot 10 is brought into the suspended environment.

Further, in the base 20 according to the embodiment, as an example, the oil supply port 110 is provided on the side on which the arm is provided with respect to the sliding parts in the gravity direction. Accordingly, in an installation environment in which the arm is provided in the upper part with respect to the sliding parts in the gravity direction, the lubricating oil may be supplied from the oil supply port 110 located in the upper part with respect to the sliding parts in the gravity direction, and thereby, the lubricating oil may be easily spread over the sliding parts. In this case, for example, the attachment surface 90 of the base 20 on the opposite side to the arm is installed on the floor and the robot 10 is brought into the floor installation environment.

(6) Another Embodiment 3:

The above described embodiments can employ various configurations explained here. Further, the various configurations explained here may be applied to different configurations from those of the above described embodiments. Here, as an example of the various configurations, the case where the robot 10 can be suspended from the ceiling is explained. In this case, for example, when rain leakage or water leakage due to burst of a water pipe or the like occurs in the ceiling on which the base 20 is installed, water may enter the base 20. Or, for example, when a fluid such as water is shot toward the ceiling on which the robot 10 is installed, the fluid may enter the base 20 from between the base 20 and the ceiling due to some failure (trouble or the like).

Figure 7A:
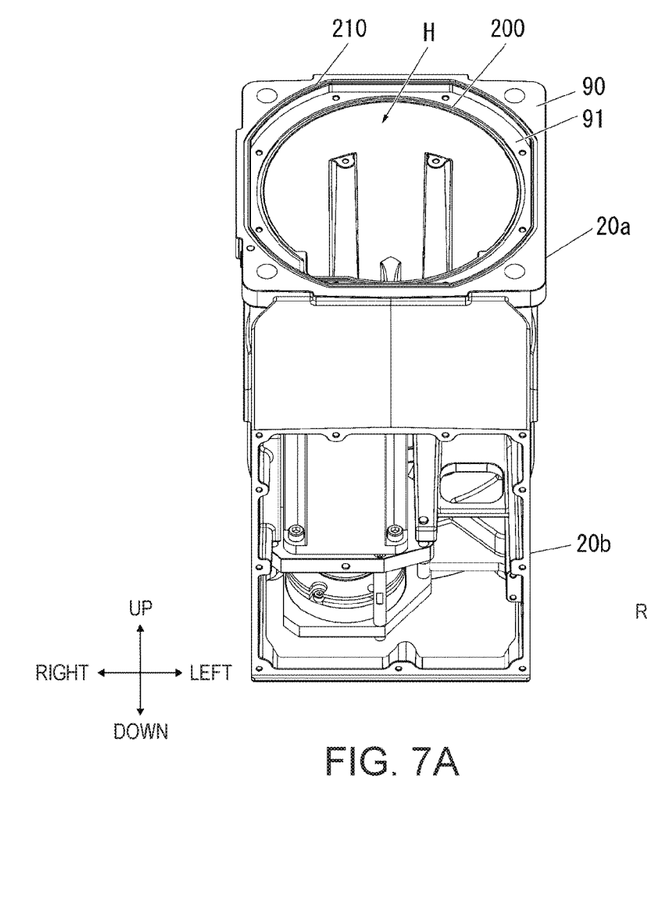
FIG. 7A is a perspective view of an example of an interior of a main body 20a of the base 20 as seen from an attachment surface 90 side.

When a fluid such as water enters the base 20, between the base 20 and the ceiling, or the like, a failure of a short electronic or electric circuit or the like may be caused. To suppress the failure, the base 20 of the robot 10 may include a first groove 200 and a second groove 210 shown in FIGS. 7A and 7B. FIG. 7A is a perspective view of an example of an interior of the main body 20a of the base 20 as seen from the attachment surface 90 side. Note that, regarding the base 20 shown in FIG. 7A, the rear side shown in FIG. 1A faces the front side of the paper surface.

As shown in FIG. 7A, in the example, a circular hole part H connecting to the inside of the base 20 is provided on in the attachment surface 90. Further, a stepped surface 91 lower from the attachment surface 90 toward the inside of the base 20 is provided on the edge of the hole part H. The outer circumference of the stepped surface 91 is inner than the attachment surface 90 and outer than the edge of the hole part H.

The stepped surface 91 is a surface to which a lid 220 for preventing entrance of a fluid such as water into the base 20 is attached. Note that, in the lid 220, wires and pipes extending from the inside of the base 20, substrates for connecting wires and pipes extending from another apparatus, etc. may be provided. Further, in the stepped surface 91, the first groove 200 is provided outside of the edge of the hole part H along the edge of the hole part H. The first groove 200 is a groove for providing a sealing member 300 that prevents entrance of a fluid such as water into the base 20 from between the stepped surface 91 and the lid 220. The sealing member 300 is e.g. a fluorine resin or the like. Note that the sealing member 300 may be formed using another material instead.

Further, in the attachment surface 90, the second groove 210 is provided outside of the outer circumference of the stepped surface 91 along the outer circumference of the stepped surface 91. The second groove 210 is a groove for providing a sealing member 310 that prevents entrance of a fluid such as water into the lid 220 side from between the attachment surface 90 and an object on which the base 20 is installed. The sealing member 310 is e.g. a fluorine resin or the like. Note that the sealing member 310 may be formed using another material instead.

Figure 7B:
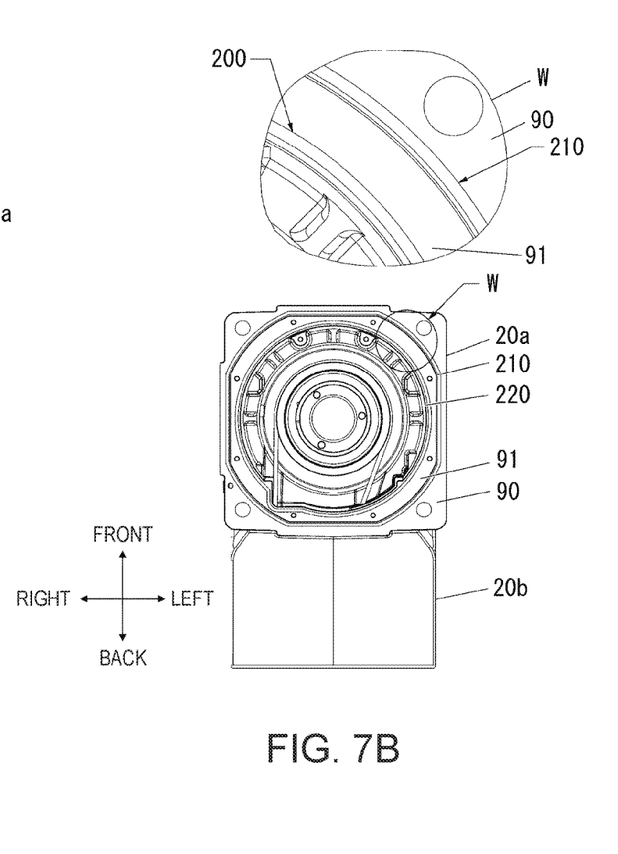
FIG. 7B shows both a top view of the base 20 shown in FIG. 7A from the upside shown in FIG. 1A and an enlarged view of a range W surrounded by a solid line of the top view.

FIG. 7B shows both a top view of the base 20 shown in FIG. 7A from the upside shown in FIG. 1A and an enlarged view of a range W surrounded by a solid line of the top view. As shown in the enlarged view of the range W, the first groove 200 is provided in the stepped surface 91 along the edge of the hole part H. Further, the second groove 210 is provided in the attachment surface 90 along the outer circumference of the stepped surface 91.

Figure 8:
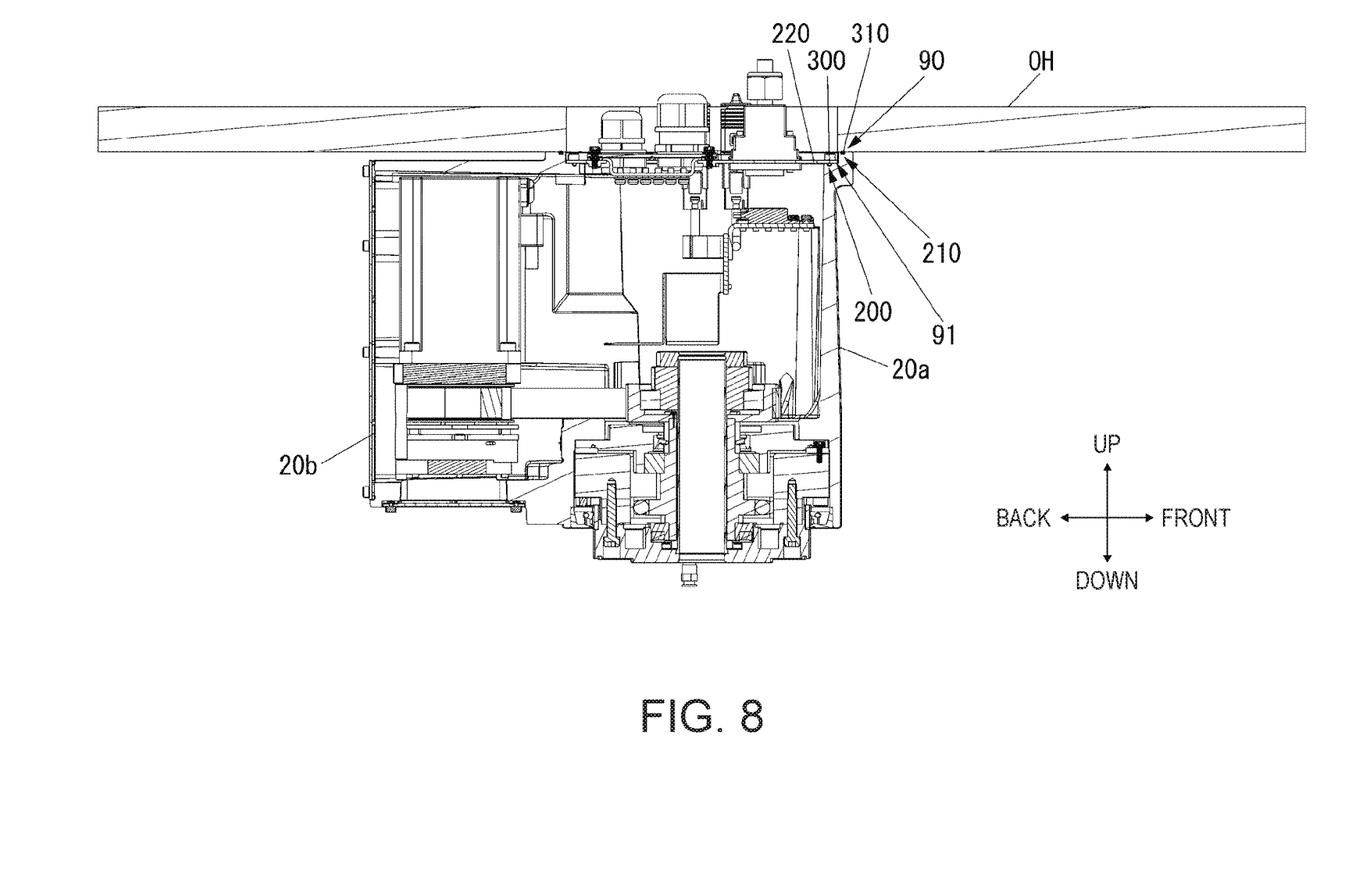
FIG. 8 shows an example of the base 20 installed on a ceiling OH.

FIG. 8 shows an example of the base 20 installed on a ceiling OH. Further, the sectional view shown in FIG. 8 is a sectional view of the base 20 cut in the front-to-back direction shown in FIG. 1A. In FIG. 8, in the base 20, the lid 220 is attached to the stepped surface 91 and the hole part H is blocked. In the state, the sealing member 300 provided in the first groove 200 blocks to prevent a fluid such as water from entering between the stepped surface 91 and the first groove 200. Thereby, the robot 10 may suppress a failure caused by entrance of the fluid into the base 20. Further, the sealing member 310 provided in the second groove 210 blocks to prevent a fluid such as water from entering between the attachment surface 90 and the ceiling OH. Thereby, the robot 10 may suppress a failure caused by entrance of the fluid between the attachment surface 90 of the base 20 and the object to which the base 20 is attached.

In the base 20 according to the embodiment, as an example, the first groove 200 for preventing entrance of the fluid into the base 20 is provided. For example, the first groove 200 is formed in the stepped surface 91 provided on the attachment surface 90 side. Further, for example, the sealing member 300 is fitted in the first groove 200 and the sealing member 300 is pressed by the lid 220. Here, the first groove 200 and the sealing member 300 are provided over the entire of the circumference of the stepped surface 91 of the base 20. Thereby, the flow of the fluid may be prevented by the sealing member 300 and entrance of the fluid from outside into the base 20 may be prevented.

Further, in the base 20 according to the embodiment, as an example, the second groove 210 for preventing the flow of the fluid between the base 20 and an object on which the base 20 is installed (e.g. a floor, the ceiling OH, a wall, or the like) is provided. For example, the second groove 210 is formed in the attachment surface 90. Further, for example, the sealing member 310 is fitted in the second groove 210 and the sealing member 310 is pressed by the object. Here, the second groove 210 and the sealing member 310 are provided over the entire of the circumference of the attachment surface 90 of the base 20. Thereby, the flow of the fluid may be prevented by the sealing member 310 and the flow of the fluid between the base 20 and the object may be prevented.

Furthermore, in the embodiment, the second groove 210 is provided outside of the first groove 200.

Note that, in the embodiment, prevention of the entrance of a liquid as a fluid is explained as an example, however, both prevention of the entrance of the liquid and prevention of entrance of a gas may be realized. As another example, a configuration that can prevent at least entrance of a gas as a fluid may be used.

As described above, the robot 10 in the embodiment can supply the lubricating oil to the sliding parts from the opposite side (in the example, the attachment surface 90 side) to the arm (in the example, the first arm 11) with respect to the sliding parts. Thereby, the robot 10 may reduce wear of the sliding parts by the lubricating oil supplied from the opposite side to the arm with respect to the sliding parts.

Further, the robot 10 can supply the lubricating oil to the sliding parts from the arm side with respect to the sliding parts. Thereby, the robot 10 may reduce wear of the sliding parts by the lubricating oil supplied from the arm side with respect to the sliding parts.

The robot 10 can be suspended from the ceiling. Thereby, the robot 10 can operate in the state where the robot is suspended from the ceiling.

Further, the robot 10 can be placed on the floor. Thereby, the robot 10 can operate in the floor placement state.

The robot 10 prevents entrance of a fluid into the base 20 by the first groove 200 and prevents entrance of a fluid between an object (in the example, a ceiling, a floor, a wall, or the like) and the base 20 by the second groove 210. Thereby, the robot 10 may suppress failures caused by entrance of the fluid into the base 20 and between the object and the base 20.

As above, the embodiments of the invention are described in detail with reference to the drawings, and the specific configurations are not limited to the embodiments and changes, replacements, deletions, etc. may be made without departing of the scope of the invention.

The entire disclosure of Japanese Patent Application No. 2015-148045, filed Jul. 27, 2015 is expressly incorporated by reference herein.

What is claimed is:

1. A robot comprising:
    a base;
    an arm provided on the base;
    a rotation shaft member that is hollow-tubular shaped, the rotation shaft member being provided in the base and the arm so as to continuously extend from the base to the arm, the rotation shaft member having a rotation axis around which the arm rotates;
    a cable routing member being configured with a plurality of cables, the cable routing member extending through an inner space of an entirety of the rotation shaft member, the cable routing member being bundled at first and second bundle positions on the rotation axis, the first bundle position being located in the base, the second bundle position being located in the arm, the cable routing member being bundled by a plate member and a bundling tool that is fastened to the plate member at the first bundle position; and
    a reducer having a sliding part, the reducer decelerating driving of the arm,
    wherein a lubricating oil is configured to be supplied to the sliding part from a location opposite to the arm with respect to the sliding part, and
    the cable routing member linearly extends between the first bundle position and the second bundle position.

2. The robot according to claim 1, wherein the lubricating oil is configured to be supplied to the sliding part from a side of the arm with respect to the sliding part.

3. The robot according to claim 2, adapted to be suspended from a ceiling.

4. The robot according to claim 3, adapted to be placed on a floor.

5. The robot according to claim 2, adapted to be placed on a floor.

6. The robot according to claim 2, wherein the base includes:
    a first groove for preventing entrance of a fluid into the base; and
    a second groove for preventing entrance of a fluid between an object on which the base is installed and the base.

7. The robot according to claim 1, adapted to be suspended from a ceiling.

8. The robot according to claim 7, adapted to be placed on a floor.

9. The robot according to claim 1, adapted to be placed on a floor.

10. The robot according to claim 1, wherein the base includes:
    a first groove for preventing entrance of a fluid into the base; and
    a second groove for preventing entrance of a fluid between an object on which the base is installed and the base.

* * * * *